(12) United States Patent
Umezuki

(10) Patent No.: US 8,498,214 B2
(45) Date of Patent: Jul. 30, 2013

(54) SWITCHING DEVICE, INFORMATION PROCESSING DEVICE, AND RECORDING MEDIUM FOR FAILURE NOTIFICATION CONTROL PROGRAM

(75) Inventor: Takeshi Umezuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 13/052,236

(22) Filed: Mar. 21, 2011

(65) Prior Publication Data
US 2011/0239058 A1    Sep. 29, 2011

(30) Foreign Application Priority Data
Mar. 26, 2010    (JP) ................................ 2010-073476

(51) Int. Cl.
*H04L 12/26*    (2006.01)
(52) U.S. Cl.
USPC ......................................................... 370/242
(58) Field of Classification Search
None
See application file for complete search history.

(56) References Cited

U.S. PATENT DOCUMENTS

| 6,192,402 | B1 | 2/2001 | Iwase | |
| 7,809,909 | B2 * | 10/2010 | Iwamura et al. | 711/162 |
| 8,041,959 | B2 * | 10/2011 | Kito et al. | 713/193 |
| 8,234,467 | B2 * | 7/2012 | Noguchi et al. | 711/162 |
| 2005/0286551 | A1 * | 12/2005 | Berman | 370/465 |

FOREIGN PATENT DOCUMENTS

| JP | 11-68745 | 3/1999 |
| JP | 2001-333072 | 11/2001 |

* cited by examiner

*Primary Examiner* — Minh-Trang Nguyen
(74) *Attorney, Agent, or Firm* — Staas & Halsey LLP

(57) ABSTRACT

A switching device includes a storage unit configured to store management information including an updated management information and a before updated management information, a specification unit configured to acquire an information for specifying management information stored in a management device which manages a failure that has occurred in an object device for the failure to be monitored and specify management information stored in the storage unit on the basis of the acquired information, and an information sending unit configured to send a failure information to the management device on the basis of the management information which has been specified using the specification unit in the case that the failure has been detected.

11 Claims, 14 Drawing Sheets

FIG. 3

Ver.6.3.0a

| OID | STATUS INFORMATION |
|---|---|
| 1.3.x.x.x.x.1 | ON |
| 1.3.x.x.x.x.2 | OFF |
| 1.3.x.x.x.x.3 | restart |
| ... | ... |

FIG. 4

Ver.6.3.0b

| OID | STATUS INFORMATION |
|---|---|
| 1.3.x.x.x.x.1 | ON |
| 1.3.x.x.x.x.2 | restart |
| 1.3.x.x.x.x.3 | OFF |
| ... | ... |

FIG. 5

| DATE | ON-SEND STATUS | ON-SEND OID | OID OF LATEST VERSION |
|---|---|---|---|
| 12/12/2009 10:00:12 | OFF | 1.3.x.x.x.x.2 | 1.3.x.x.x.x.3 |
| 12/12/2010 10:10:12 | restart | 1.3.x.x.x.x.2 | 1.3.x.x.x.x.3 |
| ... | ... | ... | ... |

SWITCHING DEVICE, INFORMATION PROCESSING DEVICE, AND RECORDING MEDIUM FOR FAILURE NOTIFICATION CONTROL PROGRAM

CROSS-REFERENCE TO RELATED APPLICATION

This application is based upon and claims the benefit of priority of the prior Japanese Patent Application No. 2010-73476, filed on Mar. 26, 2010, the entire contents of which are incorporated herein by reference.

FIELD

The present invention relates to a technique for a switching device, an information processing device, and a recording medium storing a failure notification control program.

BACKGROUND

Nowadays, SNMP (Simple Network Management Protocol) is utilized as a technique for monitoring and managing a network system that includes network equipment such as switches, Fibre Channel switches (FC switch) and the like.

An SNMP-based monitoring system includes an SNMP manager that collects MIB (Management Information Base) information from monitored object equipment (equipment as an object to be monitored) to judge the status of the monitored object equipment and SNMP agents that send the SNMP manager the MIB information. The SNMP manager collects the MIB information from, for example, ten to one hundred SNMP agents and detects a failure on the basis of the collected MIB information.

For example, a management device that includes the SNMP manager (hereinafter, referred to as a management device) stores the MIB definition file of each piece of network equipment that includes the SNMP agent and is an object to be monitored (hereinafter, referred to as monitored object equipment).

In addition, the network equipment that includes the SNMP agent also includes an MIB information storage area that stores "MIB information" indicating "OID" used to identify each monitored object in correspondence with "Status Information" indicating the status of each monitored object.

Incidentally, the MIB definition file also includes information which is the same as the MIB information.

In the case that information such as, for example, "OID" as the MIB information has been received from monitored object equipment in a situation as mentioned above, the management device specifies "Status Information" from the MIB definition file that the management device itself stores on the basis of the received OID. That is, the management device specifies the status of each piece of equipment in accordance with the MIB information which has been received from each piece of monitored object equipment.

Therefore, it is desirable that the MIB information which is managed in the MIB definition file of the management device matches MIB information which is managed in the MIB information storage region in the monitored object equipment concerned.

Next, an example in which, for example, the MIB information is different for different version of firmware will be described. For example, in MIB information obtained before the firmware is upgraded (Ver.6.3.0a), an MIB tree that includes "1.3.x.x.x.1, ON", "1.3.x.x.x.2, OFF", "1.3.x.x.x.3, restart" and others as data of "OID, Status Information" is stored.

In MIB information obtained after the firmware has been upgraded (Ver.6.3.0b), an MIB tree that includes "1.3.x.x.x.1, ON", "1.3.x.x.x.2, restart", "1.3.x.x.x.3, OFF" and others as data of "OID, Status Information" is stored.

In comparing the above mentioned tress with each other, it is found that the values "1.3.x.x.x.2" and "1.3.x.x.x.3" of OID are different from each other. In the above mentioned situation, for example, in the case the management device stores the MIB information obtained before the firmware is upgraded and the monitored object equipment stores the MIB information obtained after the firmware has been upgraded, the monitored object equipment will send the management device "1.3.x.x.x.2" as the value of OID.

In the above mentioned case, the management device specifies "restart" as "Status Information" of the monitored object equipment in accordance with "1.3.x.x.x.2" (=OID). However, "Status Information" of the monitored object corresponding to "1.3.x.x.x.2" (=OID) is "OFF" in reality. That is, the management device may erroneously specify the status of the monitored object equipment.

As described above, the MIB information that the monitored object equipment manages is changed in accordance with the version of the firmware that the monitored object equipment includes. Therefore, the MIB definition file stored in the management is updated with upgrading the firmware.

However, in related art, MIB information that an SNMP agent holds and MIB information that an SNMP manager holds are managed independently of each other, so that it may sometimes occur that updated statuses of management information that the SNMP agent and the SNMP manager manage are different from each other. That is, it may sometimes occur that management information on network equipment stored in both of the management side that manages the network equipment and the equipment side as a monitored object to be commonly used for detection of a failure does not match each other.

As described above, in the case that the updated statuses of the management information that the SNMP agent and the SNMP manager manage are different from each other, such a problem may generate that it is difficult to monitor and manage the information on the basis of the SNMP with accuracy.

For example, as described above, in the case that the MIB information which is held in the SNMP agent has been changed with upgrading the firmware or the like, it is desirable to change the MIB information which is held in the SNMP manager with no delay. Then, in the case that the MIB information held in the SNMP manager is to be updated, it may be unavoidable to stop the operation of the SNMP manager, that is, to stop the operation of the SNMP-based monitoring and management system concerned.

On the other hand, the SNMP manager manages such a large number of SNMP agents as to reach up to one hundred or more agents in a large scale system, so that stopping of the system may impede the operation of the entire system. Therefore, it may become unavoidable to perform scheduling so as to update the MIB information held in the SNMP manager at a timing that may not impede the operation of the system.

Thus, such a situation may generate that although the MIB information held in the SNMP agent has been changed, the MIB information held in the SNMP manager is not yet changed. While the above mentioned situation is lasting, the MIB information held in the SNMP agent may be left in a state that it is different from that held in the SNMP manager.

As a result, such a serious situation may occur that it becomes difficult to monitor and manage the information on the basis of the SNMP with accuracy.

Japanese Laid-open Patent Publication No. 2001-333072 is one example of related art and Japanese Laid-open Patent Publication No. 11-68745 is another example of related art.

SUMMARY

According to an embodiment, a switching device of the invention includes a storage unit configured to store a first management information indicating a management information updated and a second management information indicating a management information obtained before updated, a specification unit configured to acquire and specify the management information which is stored in a management device that manages a failure which has occurred in an object device for the failure to be monitored and specifies the first management information or the second management information stored in the storage unit on the basis of the acquired information, and an information sending unit configured to send a failure information to the management device on the basis of the management information which has been specified using the specification unit in the case that the failure has been detected.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information to be stored in an MIB storage DB as old MIB information;

FIG. 4 is a diagram illustrating an example of information to be stored in the MIB storage DB as new MIB information;

FIG. 5 is a diagram illustrating an example of information to be stored in an MIB log DB;

DESCRIPTION OF EMBODIMENTS

Embodiments of a switching device, an information processing device, and a recording medium storing a failure notification control program will be described in detail with reference to the accompanying drawings. Incidentally, the present invention is not limited by the embodiments which will be described hereinafter.

[a] Embodiment 1

In the embodiment 1, an example in which a switching device that is applied to an FC (Fibre Channel) switch will be described. In the following, a general configuration of a system including the FC switch, a configuration of the FC switch, flows of processes executed using the FC switch, and effects of the embodiment 1 will be described in this order.

Incidentally, although in the embodiment 1, an example in which MIB information is used as management information will be described, the management information is not limited to the MIB information and any information may be applied as long as it is equipment management information which may be used to manage network equipment and the like.

Figure 1:
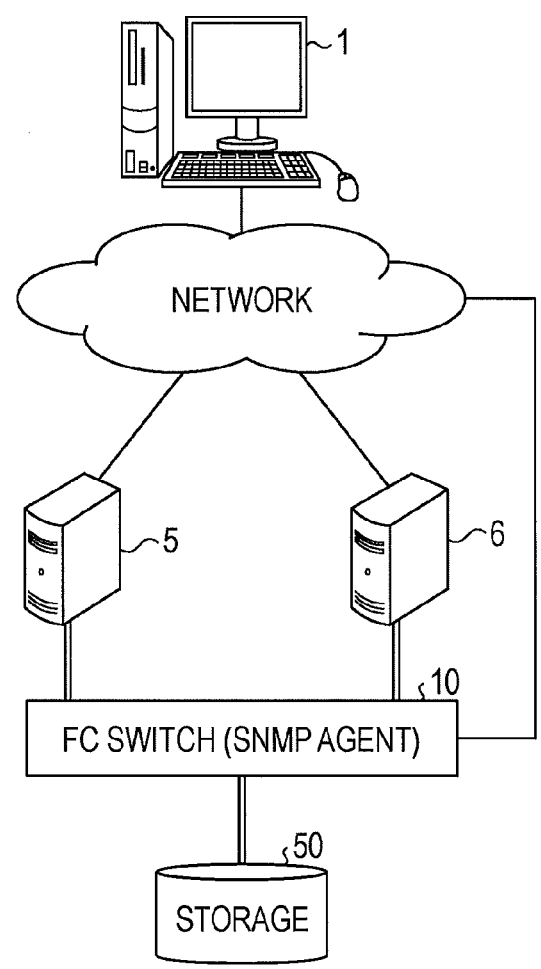
FIG. 1 is a block diagram illustrating an example of a general configuration of a system including an FC switch according to an embodiment 1.

FIG. 1 is a diagram illustrating an example of a general configuration of a system including the FC switch according to the embodiment 1.

As illustrated in FIG. 1, the system is of the type including a management device 1, a server 5, a server 6, an FC switch 10 and a storage 50 and constitutes a so-called SAN (Storage Area Network). The storage 50 is a storage device that includes a plurality of discs and stores data that the server 5 and the server 6 utilize. Incidentally, the number of each devices or the like illustrated in FIG. 1 is merely exemplary and the number of each devices is not limited to that illustrated in FIG. 1.

The management device 1 is a personal computer or a server that functions as an SNMP (Simple Network Management Protocol) manager and is connected with each of the server 5, the server 6, and the FC switch 10 over a network such as a LAN (Local Area Network) or the like.

In addition, the management device 1 includes an MIB definition file that stores MIB information for each SNMP agent and manages a failure that has occurred in a failure monitored object device. Then, the management device 1 receives MIB information from an SNMP agent concerned and detects and manages the status of equipment including the SNMP agent from which the MIB information has been sent and a failure that has occurred therein.

The sever 5 and the server 6 are connected with the storage 50 via the FC switch 10 which is connected with the servers 5 and 6 via a fibre channel to execute data writing to and data reading out of the storage 50.

The FC switch 10 is a switching device that functions as an SNMP agent and sends the management device 1 that functions as the SNMP manager MIB information by executing SNMP-based trap control or the like. For example, when an event which is designated in advance by a manager or another person has occurred, or the number of send/receive packets, the number of error packets, the activity ratio of an CPU (Central Processing Unit) or the like has become higher than a threshold value, the FC switch 10 sends the management device 1 the MIB information concerned.

In addition, the FC switch 10 is connected with each of the server 5, the server 6 and the storage 50 via a fibre channel and is connected with the management device 1 over a LAN. Then, the FC switch 10 that has accepted access from the server 5 or the server 6 to the storage 50 or access to another server or the like controls the access in accordance with routing information that it holds therein.

The FC switch 10 stores an after-MIB indicating an updated MIB and a before-MIB indicating an MIB which is obtained before updated. Then, the FC switch 10 acquires information relating to an MIB which is stored in the management device 1 that manages a failure and specifies the MIB that the management device 1 stores in MIBs stored therein on the basis of the acquired information relating to the MIB.

In other words, the FC switch 10 acquires the information used to specify the MIB that the management device 1 stores and specifies the MIB that the management device 1 stores in the MIBs stored therein. Then, when the FC switch 10 has detected the failure, the FC switch 10 sends the management device 1 information on the failure using the MIB information which is based on the specified MIB.

As described above, the FC switch 10 is allowed to send the failure information to the management device 1 using the MIB that matches the MIB information that the management device 1 manages using the MIB definition file. As a result, even in the case that updated statuses of MIB information that the SNMP agent and the SNMP manager manage are different from each other, it is allowed to execute SNMP-based monitoring and management with accuracy.

Figure 2:
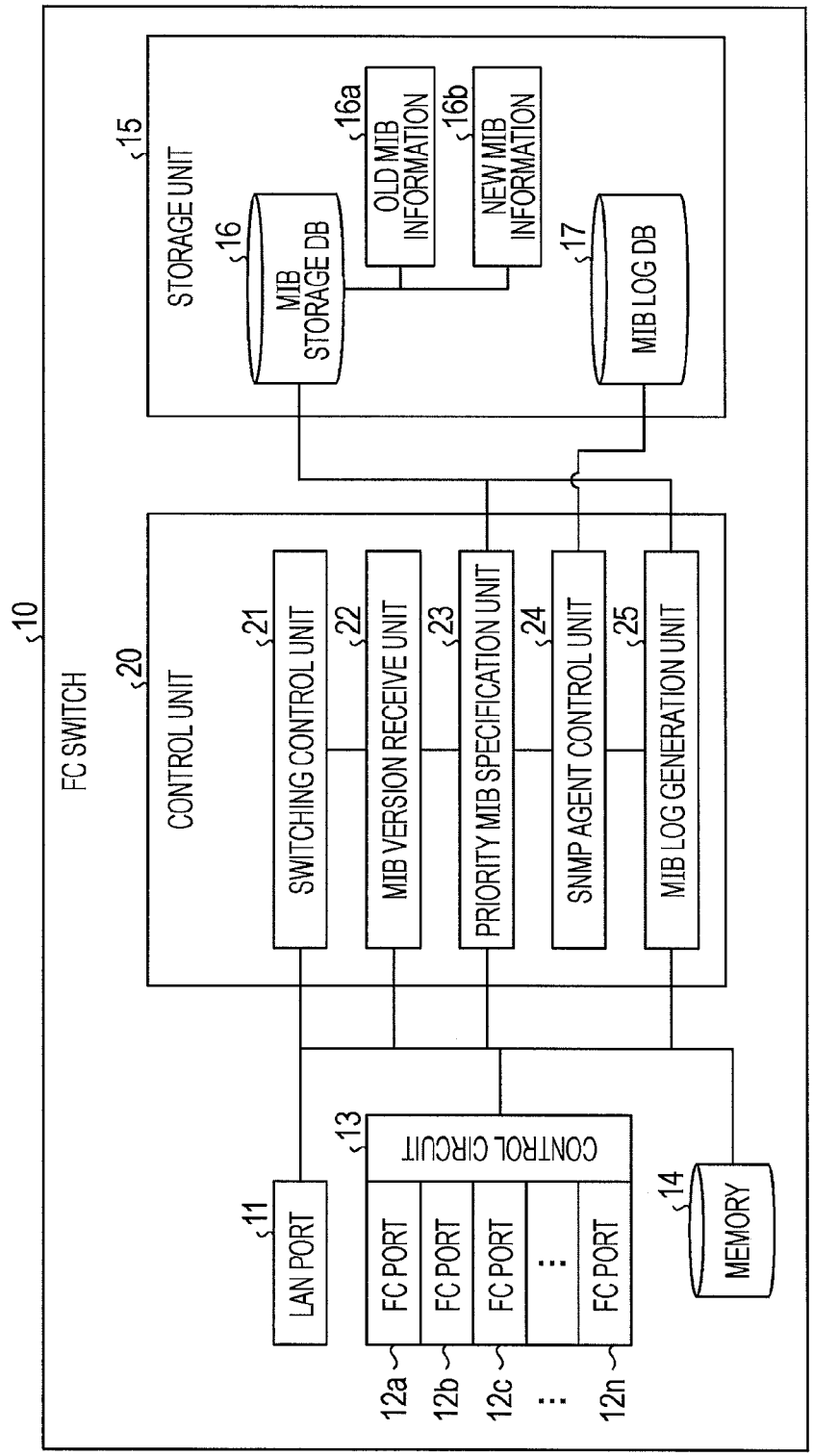
FIG. 2 is a block diagram illustrating an example of a configuration of the FC switch according to the embodiment 1.

Next, a configuration of the FC switch 10 illustrated in FIG. 1 will be described with reference to FIG. 2. FIG. 2 is a block diagram illustrating an example of the configuration of the FC switch according to the embodiment 1. As illustrated in FIG. 2, the FC switch 10 includes a LAN port 11, FC ports 12a to 12n, a control circuit 13, a memory 14, a control unit 15, and a control unit 20.

The LAN port 11 is a communication interface that connects a LAN cable with the FC switch 10 and controls communication between the FC switch 10 and a device which is connected with a network such as a LAN or the like such as, for example, the management device 1.

For example, the LAN port 11 receives MIB version information or the like from the management device 1 and sends the management device 1 MIB information.

Each of the FC ports 12a to 12n is a communication interface that connects a fibre channel (FC) with a device and controls communication between the FC switch 10 and a device which is connected with the FC switch 10 via the FC such as the server 5 or the server 6.

For example, each of the FC ports 12a to 12n receives a request to write data to the storage 50 and a request to read data out of the storage 50 from the server 5 or the server 6 and sends the server from which the request has been sent a response to the request. Incidentally, a manner or form of connecting each FC port such as, for example, the FC port 12a with each server such as, for example, the server 5 and the number of FC ports to be installed may be arbitrarily set and changed in accordance with the characteristic of a system involved and a manner or form that the system manages information.

The control circuit 13 is an integrated circuit such as, for example, an ASIC (Application Specific Integrated Circuit) or the like and controls routing of the FC ports 12a to 12n.

For example, the control circuit 13 sends a destination data that one FC port has received on the basis of routing information that a switching control unit 21 which will be described later generates.

Specifically, the control circuit 13 sends the FC port 12f data which has been received from the FC port 12a and sends the FC port 12e data which has been received from the FC port 12g. Incidentally, the control circuit 13 may control routing with reference to routing information which is stored in the memory 14 using the switching control unit 21 or may control routing by reflecting routing information in a circuit under the instruction from the switching control unit 21.

The memory 14 is a storage such as a RAM (Random Access memory) or the like that stores routing information relating to the FC ports 12a to 12n and routing information relating to the LAN port 11. Incidentally, each piece of the routing information that the memory 14 stores is generated using the switching control unit 21 and is stored in the memory 14.

The storage unit 15 is a storage such as, for example, a semiconductor memory element, a hard disk, a Compact Flash (a registered trademark) or the like that stores data and programs which are desirable for execution of various processes using the control unit 20 and includes, for example, an MIB storage DB 16 and an MIB log DB 17. Incidentally, various programs and the like which are stored in the storage unit 15 are read out into the memory 14 by being executed using the control unit 20.

The MIB storage DB 16 stores old MIB information 16a indicating MIB obtained before updated and new MIB information 16b indicating MIB which has been updated with upgrading each of control units included in the control unit 20 and/or the SNMP agent.

Incidentally, although in FIG. 2, an example in which versions of two generations are stored is illustrated, the number of generations of versions is not limited to two and versions of the arbitrary number of generations may be stored.

For example, the MIB storage DB 16 stores the old MIB information 16a indicating "OID" used to identify each monitored object in correspondence with "Status Information" indicating the status of each monitored object as the MIB information of Ver.6.3.0a as illustrated in FIG. 3.

Specifically, the MIB storage DB 16 stores the old MIB information 16a in a state in which "OID" and "Status Information" are indicated in correspondence with each other, for example, in the form of "1.3.x.x.x.x.1, ON", "1.3.x.x.x.x.2, OFF", "1.3.x.x.x.x.3, restart" and others. Incidentally, FIG. 3 is a diagram illustrating an example of information which is stored in the MIB storage DB as the old MIB information.

Likewise, the MIB storage DB 16 stores the new MIB information 16b indicating "OID" in correspondence with "Status Information" as the MIB information of Ver.6.3.0b as illustrated in FIG. 4 as in the case of the old MIB information 16a. Specifically, the MIB storage DB 16 stores the new MIB information 16b in a state in which "OID" and "Status Information" are indicated in correspondence with each other, for example, in the form of "1.3.x.x.x.x.1, ON", "1.3.x.x.x.x.2, restart", "1.3.x.x.x.x.3, OFF" and others. Incidentally, FIG. 4 is a diagram illustrating an example of information which is stored in the MIB storage DB as the new MIB information.

In addition, the old MIB information 16a and the new MIB information 16b which are stored in the MIB storage DB 16 may be either automatically updated with upgrading each of the control units included in the control unit 20 and/or the SNMP agent or manually updated by a manager or another person.

In addition, in the case that each control unit included in the control unit 20 is implemented using firmware, the old MIB information and the new MIB information may be automatically uploaded with upgrading the firmware.

The MIB log DB 17 stores a log indicating MIB information which has been sent to the management device 1 in correspondence with the actual status of the FC switch at a time point when the MIB information has been sent to the management device 1. For example, the MIB log DB 17 stores "Date, On-Send Status, On-Send OID, OID of Latest Version" in correspondence with one another, for example, in the form of "2009/12/12 10:00:12, OFF, 1.3.x.x.x.x.2, 1.3.x.x.x.x.3", "2010/12/12 10:10:12, restart, 1.3.x.x.x.x.2, 1.3.x.x.x.x.2" and others as illustrated in FIG. 5. The information which is stored as illustrated in FIG. 5 is generated using an MIB log generation unit 25 which will be described later and is stored in the MIB log DB 17.

Incidentally, FIG. 5 is a diagram illustrating an example of the information which is stored in the MIB log DB 17.

"Date" which is stored in the above mentioned example indicates a date on which the MIB information concerned has been sent using an SNMP agent control unit 24 which will be described later. "On-Send Status" indicates the actual status of the FC switch at a time point when the OID concerned has been sent using the SNMP agent control unit 24. "On-Send OID" indicates a value of OID which has been sent as the MIB information concerned by executing trap processing using the SNMP agent control unit 24.

"OID of Latest Version" is a value of the OID used to specify "On-Send Status" in the new MIB information 16b which is stored in the MIB storage DB 16 at a time point when the OID has been sent using the SNMP agent control unit 24.

That is, in "2009/12/12 10:00:12, OFF, 1.3.x.x.x.x.2, 1.3.x.x.x.x.3" indicated in FIG. 5, "On-Send OID" does not match "OID of Latest Version" and hence it is found that any failure notification is not made by using MIB of the latest version.

In "2010/12/12 10:10:12, restart, 1.3.x.x.x.x.2, 1.3.x.x.x.x.2" indicated in FIG. 5, "On-Send OID" matches "OID of Latest Version" and hence it is found that a failure notification has been made by using the MIB of the latest version.

The control unit 20 is an electronic circuit such as, for example, a CPU, an MPU (Micro Processing Unit) or the like.

The control unit 20 includes an internal memory that stores control programs for controlling OS (Operating System) and the like, programs that define various processing procedures and desirable data.

In addition, the control unit 20 includes the switching control unit 21, an MIB version receive unit 22, a priority MIB specification unit 23, the SNMP agent control unit 24 and the MIB log generation unit 25 and executes various processes using these units.

In the case that the control unit 20 or each control unit included in the control unit 20 has been upgraded, the control unit 20 uploads MIB information concerned.

For example, in the case that upgrading has been executed, the control unit 20 changes the data of the new MIB information 16b which is stored in the MIB storage DB 16 to that of the old MIB information 16a and stores MIB information which is newly obtained (updated) with upgrading the unit concerned as new MIB information 16b.

Next, description will be made returning to explanation of the respective control units included in the control unit 20.

The switching control unit 21 generates the routing information relating to the FC ports 12a to 12n and the routing information relating to the LAN port 11 and stores the generated routing information in the memory 14 or the like.

For example, the switching control unit 21 generates each piece of routing information on the basis of the connecting statues of the LAN port 11 and the FC ports that a manager or another person has set, header information of a packet which has been received via each port and the like and stores the generated information in the memory 14.

In addition, the switching control unit 21 is also allowed to reflect the generated routing information relating to the FC ports 12a to 12n in an internal circuit included in the control circuit 13 to set the routing information in that control circuit 13.

The MIB version receive unit 22 acquires information on the MIB stored in the management device 1 and specifies the MIB information that the management device 1 stores in the MIB information n stored in the MIB storage DB on the basis of the acquired information n on the MIB.

For example, in the case that the information in the MIB storage DB 16 has been updated with upgrading the control unit 20 or each control unit included in the control unit 20, the MIB version receive unit 22 acquires version information of the MIB of the FC switch 10 that the management device 1 stores from the management device 1.

Then, the MIB version receive unit 22 outputs the acquired version information to the priority MIB specification unit 23.

Next, description will be made by giving a specific example of the above. In the case that the old MIB information 16a and the new MIB information 16b stored in the MIB storage DB 16 have been updated, the MIB version receive unit 22 sends the management device 1 a request to give the version information of the MIB of the FC switch 10 that the management device 1 stores.

Then, in the case that the MIB version receive unit 22 has received "6.3.0a" as the version information of the MIB of the FC switch 10 that the management device 1 manages, the MIB version receive unit 22 outputs "6.3.0a" to the priority MIB specification unit 23.

Incidentally, the opportunity at which the MIB version receive unit 22 acquires the version information of the MIB of the FC switch 10 that the management device 1 stores is not limited to a case in which the control unit 20 or each control unit included in the control unit 20 has been upgraded to update the information in the MIB storage DB 16.

For example, in the case that the MIB stored in the management unit 1 has been updated, the management device 1 may send the MIB version receive unit 22 the version information of the newly updated MIB.

Also in the above mentioned case, the MIB version receive unit 22 outputs the acquired version information to the priority MIB specification unit 23.

The priority MIB specification unit 23 specifies the MIB information that the management device 1 stores in the MIB information stored in the MIB storage DB 16 on the basis of the version information on the MIB which has been acquired using the MIB version receive unit 22.

For example, it is supposed that the priority MIB specification unit 23 has received "6.3.0a" from the MIB version receive unit 22 in a state in which information on "Ver.6.3.0a" is stored in the old MIB information 16a in the MIB storage DB 16 and information on "Ver.6.3.0b" is stored in the new MIB information 16b in the MIB storage DB 16.

In the above mentioned case, the priority MIB specification unit 23 determines the old MIB information 16a that matches "6.3.0a" which has been received from the MIB version receive unit 22 as priority MIB information.

Then, the priority MIB specification unit 23 may either store the determined priority MIB information in the memory 14 or add a flag or the like to the MIB storage DB 16 so as to specify which one is the priority MIB information.

The priority MIB specification unit 23 specifies priority MIB information every time the version information of the MIB that the management device 1 manages is received by the MIB version receive unit 22 and the priority MIB specification unit 23 receives the version information from the MIB version receive unit 22.

That is, the priority MIB specification 23 is allowed to acquire MIB information in real time both when the MIB information in the FC switch 10 has been updated and when the MIB information in the management device 1 has been updated.

Therefore, the priority MIB specification unit 23 is allowed to specify the version information of the MIB that the management device 1 manages in real time and with accuracy.

The SNMP agent control unit 24 is a control unit that executes the SNMP agent and sends the management device 1 the priority MIB information which is specified using the priority MIB specification unit 23 when a failure has been detected.

For example, in the case that the failure has been detected using the FC switch 10, the SNMP agent control unit 24 acquires the OID corresponding to the failure from the priority MIB information and sends it to the management device 1.

Specifically explaining the situation in relation to the above mentioned example, in the case that the FC switch 10 has detected a failure that the device power source is "OFF", the SNMP agent control unit 24 sends the priority MIB specification unit 23 a request to give the priority MIB information and acquires "6.3.0a" as the priority MIB information.

Then, the SNMP agent control unit 24 sends the management device 1 "1.3.x.x.x.x.2" (=OID) corresponding to "OFF" (=Status Information) held in the old MIB information 16*a* which is the MIB information of "6.3.0a".

Then, the SNMP agent control unit 24 sends the MIB log generation unit 25 a notification that the detected failure is "OFF" and "1.3.x.x.x.x.2" (=OID) has been sent as the information of the failure concerned.

Alternatively, the SNMP agent control unit 24 may make sure that the priority MIB information which has been specified using the priority MIB specification unit 23 is "6.3.0a" from a notification sent from the priority MIB specification unit 23, data in the memory 14 or the like.

Alternatively, the SNMP agent control unit 24 may acquire the priority MIB information itself such as, for example, the old MIB information 16*a* or the like from the priority MIB specification unit 23.

As means or tools that the SNMP agent control unit 24 uses to detect a failure, functions which are generally utilized on the basis of the SNMP such as a function of detecting a failure by polling executed on the side of the SNMP manager, a spontaneous failure-detecting function utilizing a trapping function of the agent and the like may be adopted.

In the case that the MIB information has been sent from the SNMP agent control unit 24 to the management device 1, the MIB log generation unit 25 stores the sent information, failure information and the like in the MIB log DB 17.

For example, it is supposed that the MIB log generation unit 25 has received "2010/2/11 23:10:15, OFF, 1.3.x.x.x.x.2" as data on the sent date, the failure occurred and the sent OID from the SNMP agent control unit 24.

In the above mentioned situation, the MIB log generation unit 25 generates a new record of date "2010/2/11 23:10:15" in the MIB log DB 17, and stores "OFF" into "On-Send Status" and "1.3.x.x.x.x.2" into "On-Send OID" in that record.

Then, the MIB log generation unit 25 refers to the new MIB information 16*b* obtained under date of "2010/2/11 23:10:15" and acquires "1.3.x.x.x.x.3" (=OID) corresponding to "OFF" (=Status Information) from the new MIB information 16*b*.

Then, the MIB log generation unit 25 stores the acquired "1.3.x.x.x.x.3" (=OID) into the MIB log DB 17 as "OID of Latest Version" in the record under date of "2010/2/11 23:10:15" (=Date).

Next, flows of processes executed using the FC switch 10 will be described with reference to FIG. 6 to FIG. 8.

Figure 6:
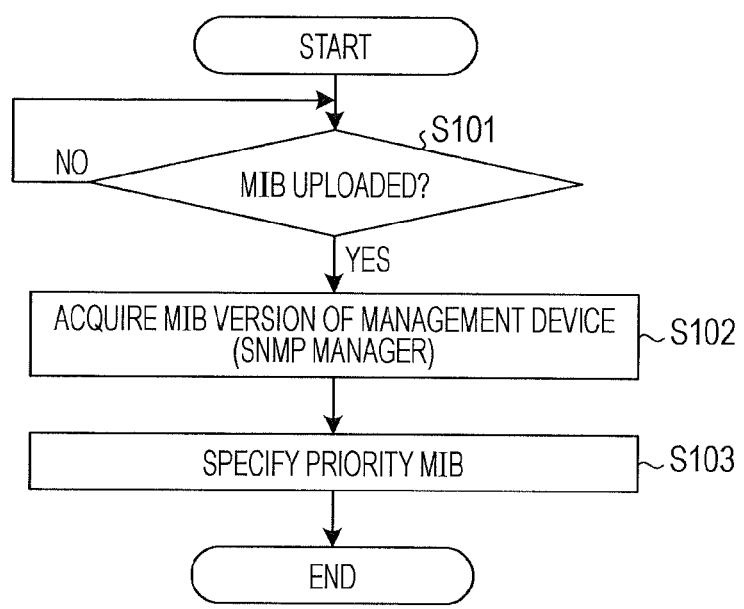
FIG. 6 is a flowchart illustrating an example of a flow of an MIB specifying process executed using the FC switch according to the embodiment 1.

FIG. 6 is a flowchart illustrating an example of a flow of an MIB specifying process executed using the FC switch according to the embodiment 1.

Figure 7:
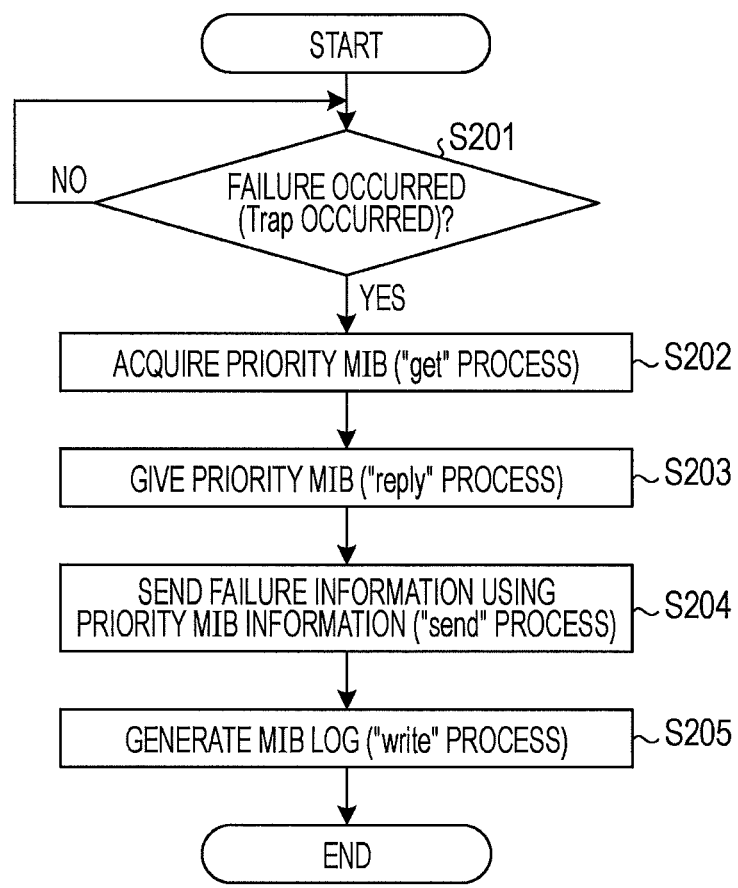
FIG. 7 is a flowchart illustrating an example of a flow of an MIB notifying process executed using the FC switch according to the embodiment 1.

FIG. 7 is a flowchart illustrating an example of a flow of an MIB notifying process executed using the FC switch according to the embodiment 1.

Figure 8:
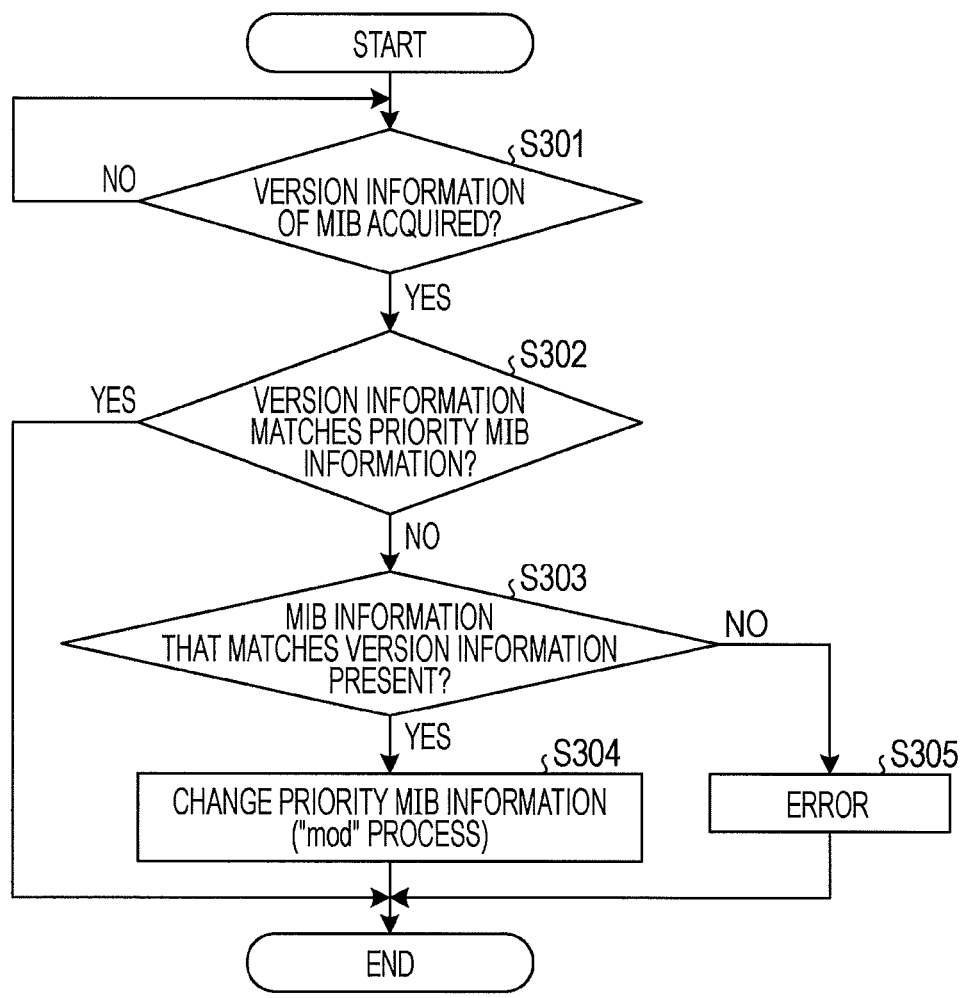
FIG. 8 is a flowchart illustrating an example of a flow of a priority MIB updating process executed using the FC switch according to the embodiment 1.

FIG. 8 is a flowchart illustrating an example of a flow of an MIB updating process executed using the FC switch according to the embodiment 1.

First, the flow of the MIB specifying process executed using the FC switch according to the embodiment 1 will be described with reference to FIG. 6.

As illustrated in FIG. 6, when MIB information in the MIB DB 16 is uploaded with upgrading the control unit 20 or each unit included in the control unit 20 (Yes at step S101), the FC switch executes the process at step S102.

Specifically, the MIB version receive unit 22 of the FC switch 10 acquires version information of the MIB of the FC switch 10 that the management device 1 manages from the management device 1 that functions as the SNMP manager.

Then, the MIB version receive unit 22 outputs the acquired version information of the MIB to the priority MIB specification unit 23.

Then, the priority MIB specification unit 23 of the FC switch 10 specifies MIB information that the management device 1 stores in the MIB information stored in the MIB storage DB 16 on the basis of the version information of the MIB that the MIB version receive unit 22 has acquired (step S103).

Next, the flow of the MIB notifying process executed using the FC switch according to the embodiment 1 will be described with reference to FIG. 7.

As illustrated in FIG. 7, the SNMP agent control unit 24 that detects that a failure has occurred in the FC switch 10 (Yes at step S201) executes a "get" process of sending a request to acquire priority MIB information to the priority MIB specification unit 23 (step S202).

Then, the priority MIB specification unit 23 executes a "reply" process of sending the SNMP agent control unit 24 the specified priority MIB information as a response to the request given from the SNMP agent control unit 24 (step S203).

Then, the SNMP agent control unit 24 executes a "send" process of sending the management device 1 the OID of the MIB information as failure information indicating the detected failure with the use of the MIB information that the priority MIB specification unit 23 has specified (step S204).

Then, the MIB log generation unit 25 executes a "write" process of storing the sent information, the failure information and the like into the MIB log DB 17 in the case that the MIB information has been sent from the SNMP agent control unit 24 to the management device 1 (step S205).

Next, the flow of the MIB updating process executed using the FC switch according to the embodiment 1 will be described with reference to FIG. 8.

As illustrated in FIG. 8, the MIB version receive unit 22 receives the version information of the MIB of the FC switch 10 that the management device 1 manages as change information indicating that the MIB of the FC switch 10 that the management device 1 manages has been changed from the management device 1 (step S301).

Next, the priority MIB specification unit 23 judges whether the received version information of the MIB matches the current version of the priority MIB information (step S302). Then, in the case that the received version information of the MIB matches the current version of the priority MIB information (Yes at step S302), the priority MIB specification unit 23 terminates execution of the MIB updating process without changing the priority MIB information.

On the other hand, in the case that the received version information of the MIB does not match the current version of the priority MIB information (No at step S302), the priority MIB specification unit 23 judges whether MIB information that matches the received version information of the MIB is stored in the MIB storage DB 16 (step S303).

In the case that MIB information that matches the received version information of the MIB is stored in the MIB storage DB 16 (Yes at step S303), the priority MIB specification unit 23 executes a "mod" process of setting the MIB information that matches the received version information of the MIB as new priority MIB information (step S304).

On the other hand, in the case that MIB information that matches the received version information of the MIB is not stored in the MIB storage DB 16 (No at step S303), the priority MIB specification unit 23 judges that the MIB information that the management device 1 manages is not present in the FC switch 10. Then, the priority MIB specification unit 23 executes error processing of outputting the alarm or the like indicating occurrence of an error to the management device 1 or the like (step S305).

Then, the processes illustrated in FIG. 6 and FIG. 7 are executed using the updated priority MIB information.

As described above, according to the embodiment 1, it is allowed to perform SNMP-based monitoring and management with accuracy even for a time period from when MIB information on the side of the SNMP agent has been changed to when the MIB information on the side of the SNMP manager is changed with changing the MIB information on the side of the SNMP agent.

Even in the case that a function is upgraded when firmware is upgraded, it is allowed to send corresponding failure information when the MIB concerned is sent by acquiring the support status of the SNMP manager.

Even when the MIB that the SNMP manager manages has been changed, it is allowed to send the MIB corresponding thereto as failure information.

In addition, it is allowed to manage failure information to be sent in its original version and failure information which has been sent in reality in the MIB log DB 17 so as to be utilized in analysis executed upon occurrence of a failure.

Further, it is also allowed to cope with downgrading of the corresponding MIB on the side of the SNMP manager by holding as a large number of pieces of past MIB information as possible in the MIB log DB 17.

According to according to above-mentioned embodiment 1, such an effect may be obtained that accurate execution of monitoring and management on the basis of SNMP is allowed even in the case that updated statuses of management information that the SNMP agent and the SNMP manager manage are different from each other.

[b] Embodiment 2

Incidentally, the FC switch can be configured to allow cascade-connection of a plurality of FC switches with one another.

Thus, in the embodiment 2, an example in which priority MIB is specified using the cascade-connected FC switches will be described.

Incidentally, although in the embodiment 2, an example in which two FC switches are cascade-connected with each other will be described, the example does not limit the number of FC switches to be cascade-connected.

First, an example of FC switches which are cascade-connected with each other will be described with reference to FIG. 9.

Figure 9:
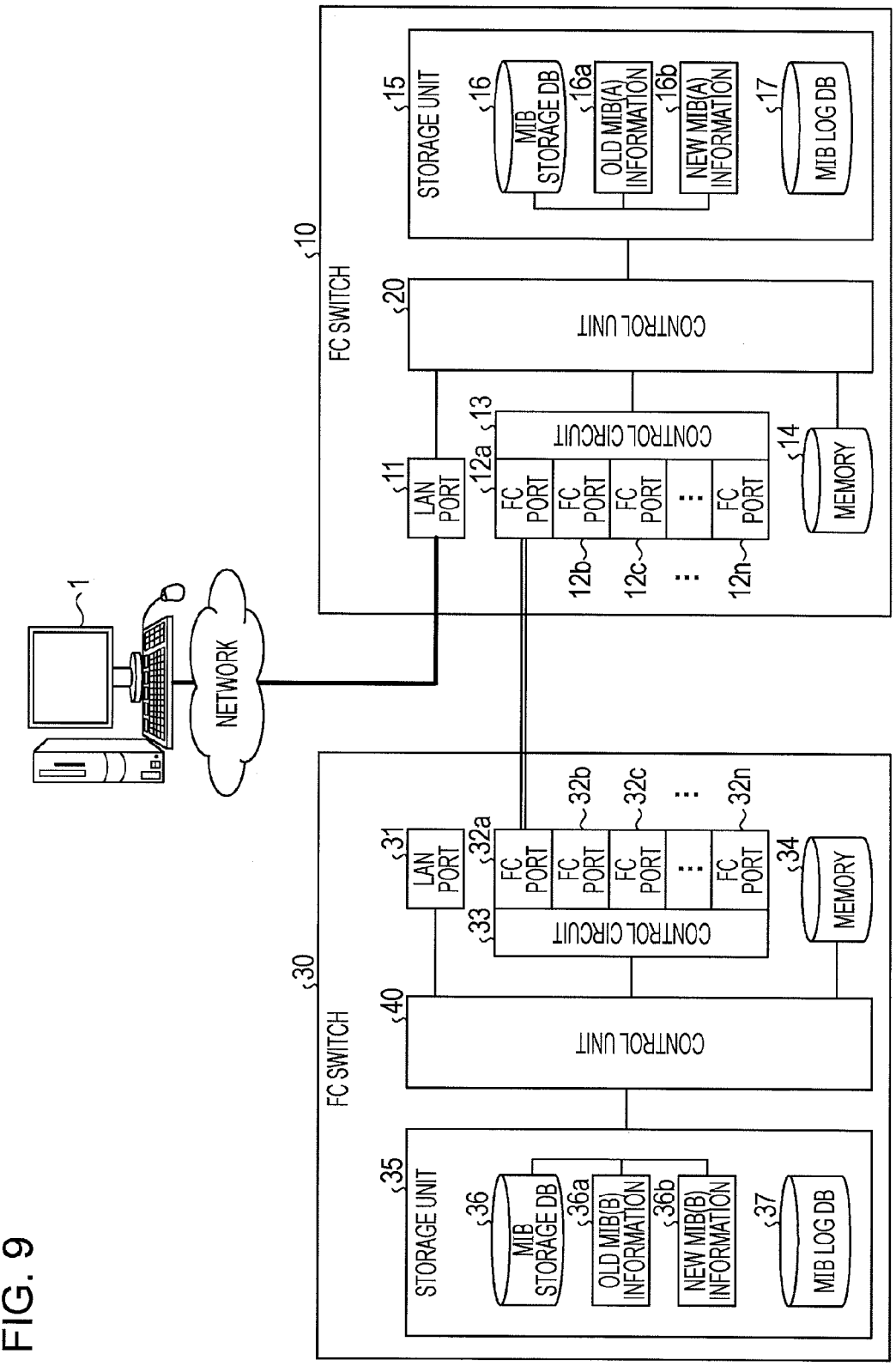
FIG. 9 is a diagram illustrating an example of cascade-connected FC switches according to an embodiment 2.

FIG. 9 is a diagram illustrating an example of the cascade-connected FC switches according to the embodiment 2.

As illustrated in FIG. 9, the FC switch 10 is cascade-connected with an FC switch 30 and the FC switch 10 is connected with the management device 1 over a network.

The configuration of the FC switch 10 is same as that of the FC switch 10 which has been described in the embodiment 1. Likewise, the configuration of the FC switch 30 is the same as that of the FC switch 10 which has been described in the embodiment 1.

Specifically, a LAN port 31, FC ports 32*a* to 32*n* and a control circuit 33 included in the FC switch 30 respectively function in the same manner as the LAN port 11, the FC ports 12*a* to 12*n* and the control circuit 13 included in the FC switch 10.

Likewise, a memory 34, a storage unit 35 and a control unit 40 included in the FC switch 30 respectively function in the same manner as the memory 14, the storage unit 15 and the control unit 20 included in the FC switch 10.

Incidentally, the MIB information corresponding to the FC switch 10 is stored in the MIB storage DB 16 of the FC switch 10, while MIB information corresponding to the FC switch 30 is stored in an MIB storage DB 36 of the FC switch 30.

That is, the respective FC switches store the MIB information corresponding to their own control units, in other words, software and firmware that the respective FC switches include.

Specifically, the MIB storage DB 16 of the FC switch 10 stores old MIB information (A) 16*a* and new MIB information (A) 16*b* as MIB information of the FC switch 10. Likewise, the MIB storage DB 36 of the FC switch 30 stores old MIB information (B) 36*a* and new MIB information (B) 36*b* as MIB information of the FC switch 30.

Next, the flow of an MIB specifying process executed using the cascade-connected FC switches illustrated in FIG. 9 will be described with reference to FIG. 10.

Figure 10:
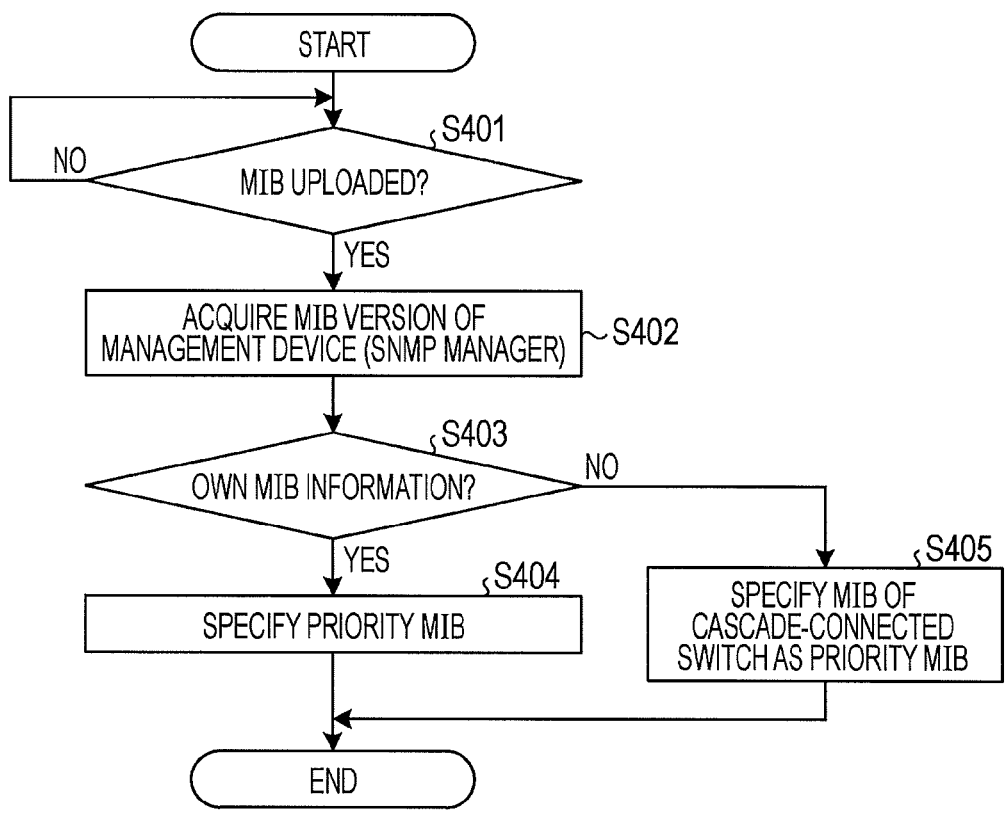
FIG. 10 is a flowchart illustrating an example of a flow of an MIB specifying process executed using the FC switches according to the embodiment 2.

FIG. 10 is a flowchart illustrating an example of the flow of the MIB specifying process executed using the FC switches according to the embodiment 2.

As illustrated in FIG. 10, in the case that the MIB storage DB of the FC switch 10 or the FC switch 30 has been uploaded (Yes at step S401), the MIB version receive unit 22 of the FC switch 10 executes the process at step S402.

Specifically, the MIB version receive unit 22 of the FC switch 10 acquires version information of the MIB which is managed using the management device 1 that functions as the SNMP manager.

Then, the priority MIB specification unit 23 of the FC switch 10 judges whether the version information of the MIB which has been acquired using the MIB version receive unit 22 matches the MIB information stored in the MIB storage DB 16 of the FC switch 10 (step S403).

Then, in the case that the acquired version information of the MIB matches the MIB information stored in the MIB storage DB 16 of the FC switch 10 (Yes at step S403), the priority MIB specification unit 23 of the FC switch 10 specifies the MIB information that matches the acquired version information of the MIB as the priority MIB information (step S404).

On the other hand, in the case that the acquired version information of the MIB does not match the MIB information stored in the MIB storage DB 16 of the FC switch 10 (No at step S403), the priority MIB specification unit 23 of the FC switch executes the process at step S405.

Specifically, the priority MIB specification unit 23 of the FC switch 10 specifies MIB information that matches the acquired version information of the MIB in the MIB information stored in the MIB storage DB 36 of the cascade-connected FC switch 30 (which is cascade-connected with the FC switch 10) as the priority MIB information.

Then, the SNMP agent control unit 24 acquires the MIB information of the FC switch 30 which has been specified using the priority MIB specification unit 23 via a cascade connection line and sends failure information to the management device 1 using the acquired MIB information of the FC switch 30.

In addition, the FC switch 10 receives change information of the MIB from the management device 1, and in the case that the change information matches the MIB information of the cascade-connected FC switch 30, determines the MIB information of the cascade-connected FC switch 30 as the priority MIB information as in the same manner as that in the process illustrated in FIG. 10.

On the other hand, in the case that the change information matches the MIB information of the FC switch 10, the FC switch 10 determines its own MIB information as the priority MIB information.

As described above, according to the embodiment 2, the FC switch 10 is allowed to send the management device 1 the MIB information which is the failure information without storing both of its own MIB information and the MIB information of the cascade-connected FC switch 30.

As a result, the FC switch 10 is allowed to eliminate duplicated storage of the MIB information into the respective MIB storage OBs by centrally managing the MIB information in cooperation with the FC switch 30.

In addition, the FC switch 10 may store, for example, MIB information which has been specified as the priority MIB information and is stored in the FC switch 30 into its own storage unit 15 in order to avoid such a situation that the MIB information is acquired via the cascade connection line (from a cascade-connected FC switch such as, for example, the FC switch 30) every time a failure is detected.

As a result, the FC switch 10 is allowed to avoid the situation that the MIB information is acquired via the cascade connection line every time a failure is detected and is allowed to rapidly notify the management device 1 of the failure information.

[c] Embodiment 3

Incidentally, although in the embodiment 2, an example in which one of two FC switches which are cascade-connected with each other is connected with the management device 1 has been described, a manner of connecting the respective elements is not limited to the above.

For example, the system may be configured such that only one of the FC switches executes an SNMP-based failure notifying process in a state in which both of two cascade-connected FC switches are connected with the management device 1.

Therefore, in the embodiment 3, an example in which two cascade-connected FC switches are connected with the management device 1 will be described with reference to FIG. 11.

Figure 11:
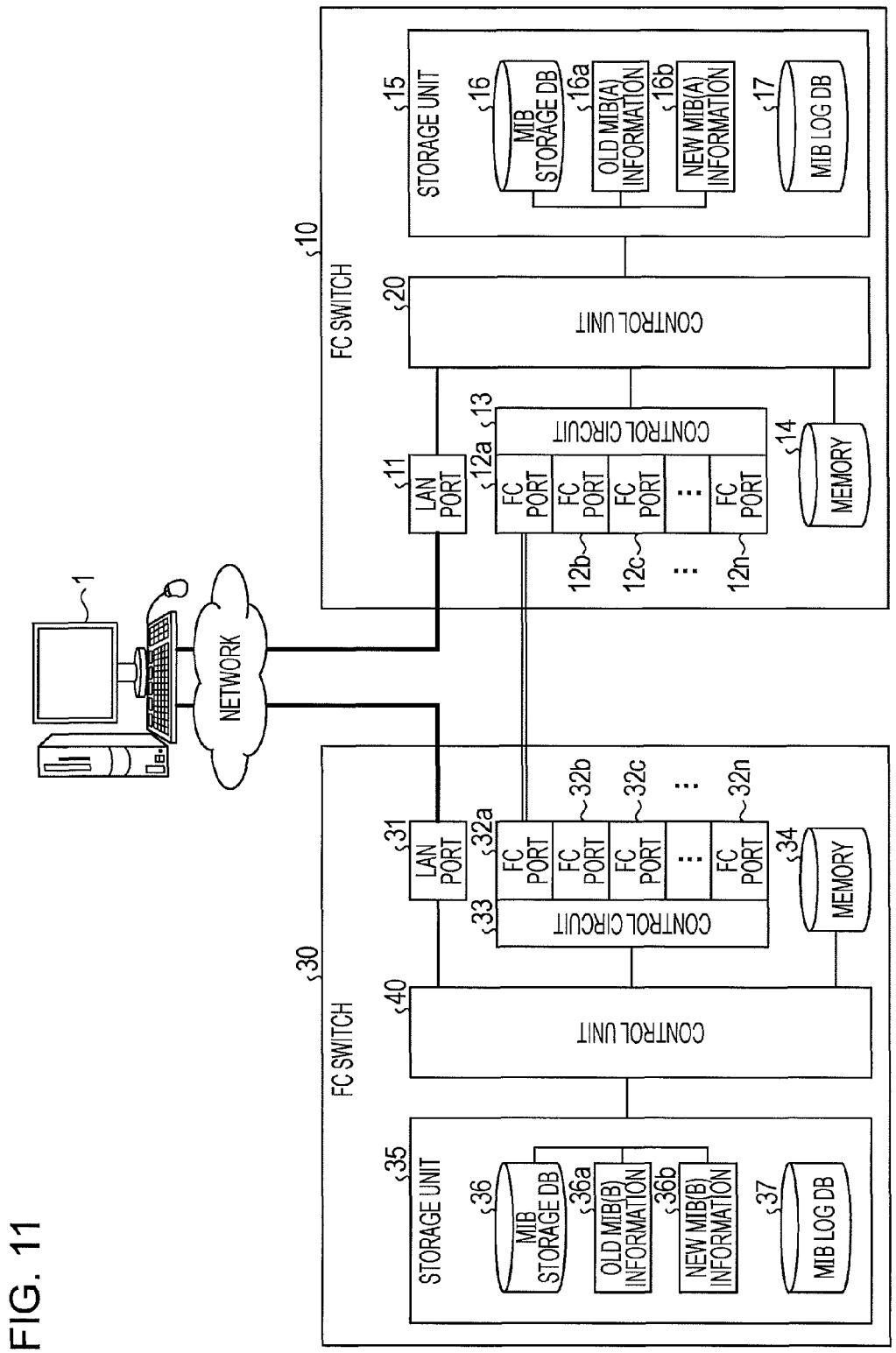
FIG. 11 is a diagram illustrating an example of cascade-connected FC switches according to an embodiment 3.

FIG. 11 is a diagram illustrating an example of a configuration of the cascade-connected FC switches according to the embodiment 3.

As illustrated in FIG. 11, the FC switch 10 and the FC switch 30 are cascade-connected with each other and the FC switch 10 is connected with the management device 1 over a network as in the case in the embodiment 2. In addition, the configuration of the FC switch 10 is the same as that of the FC switch 10 which has been described in the embodiment 2 and the configuration of the FC switch 30 is also the same as that of the FC switch 30 which has been described in the embodiment 2.

However, the FC switch 30 which is cascade-connected with the FC switch 10 is also connected with the management device 1 unlike the FC switch 30 in the embodiment 2.

In the above mentioned situation, respective control units included in the FC switch 10 execute the MIB specifying process, the MIB notifying process and the priority MIB updating process which have been described in the embodiment 1 and the embodiment 2.

It is supposed that disconnection of communication between the FC switch 10 and the management device 1 has been detected using the SNMP agent control unit 24 of the FC switch 10 in the above mentioned situation.

In the above mentioned case, the SNMP agent control unit 24 of the FC switch 10 requests respective control units included in the FC switch 30 which is cascade-connected with the FC switch 10 to execute an SNMP-based failure information (OID) notifying process as proxy for the FC switch 10. The control unit 40 of the FC switch 30 that has received the request executes the failure information notifying process as proxy for the FC switch 10.

In executing the process as proxy for the FC switch 10, the FC switch 30 may execute all the processes that the respective control units included in the FC switch 10 have ever executed as proxy for the FC switch 10 or may play the part of only a specific control unit such as, for example, the SNMP agent control unit 24.

In addition, in the case that the FC switch 30 has received a notification that communication between the FC switch 10 and the management device 1 has been recovered, the FC switch 30 may either stop executing the process that the FC switch 30 has executed so far as proxy for the FC switch 10 by performing arbitrary setting or keep executing the process as proxy for the FC switch 10.

As described above, according to the embodiment 3, even in the case that a communication failure has occurred in an FC switch that includes only a single LAN port in general, it is allowed to execute a process such as a failure notifying process via an FC switch which is cascade-connected with the above mentioned FC switch and hence the stability of the entire system may be increased.

[d] Embodiment 4

Incidentally, although in the embodiments 1 to 3, examples in which one or two FC switches is/are connected with one management device have been described, the manner of connecting respective elements is not limited to the above.

The FC switch is allowed to specify priority MIB information which is suited for each management device and to execute an arbitrary failure notifying process using MIB information that each management device manages even in the case that it is connected with a plurality of management devices.

Therefore, in the embodiment 4, an example in which in the case that an FC switch is connected with a plurality of management devices, the FC switch specifies priority MIB information which is suited for each management device and executes a failure notifying process using MIB information that each management device manages will be described with reference to FIG. 12 to FIG. 15. Incidentally, although in the embodiment 4, cascade-connected FC switches will be described by way of example, even one FC switch of the type which is not cascade-connected with another FC switch such as, for example, an FC switch as described in the embodiment 1 is allowed to execute the process in the same manner as the above.

Figure 12:
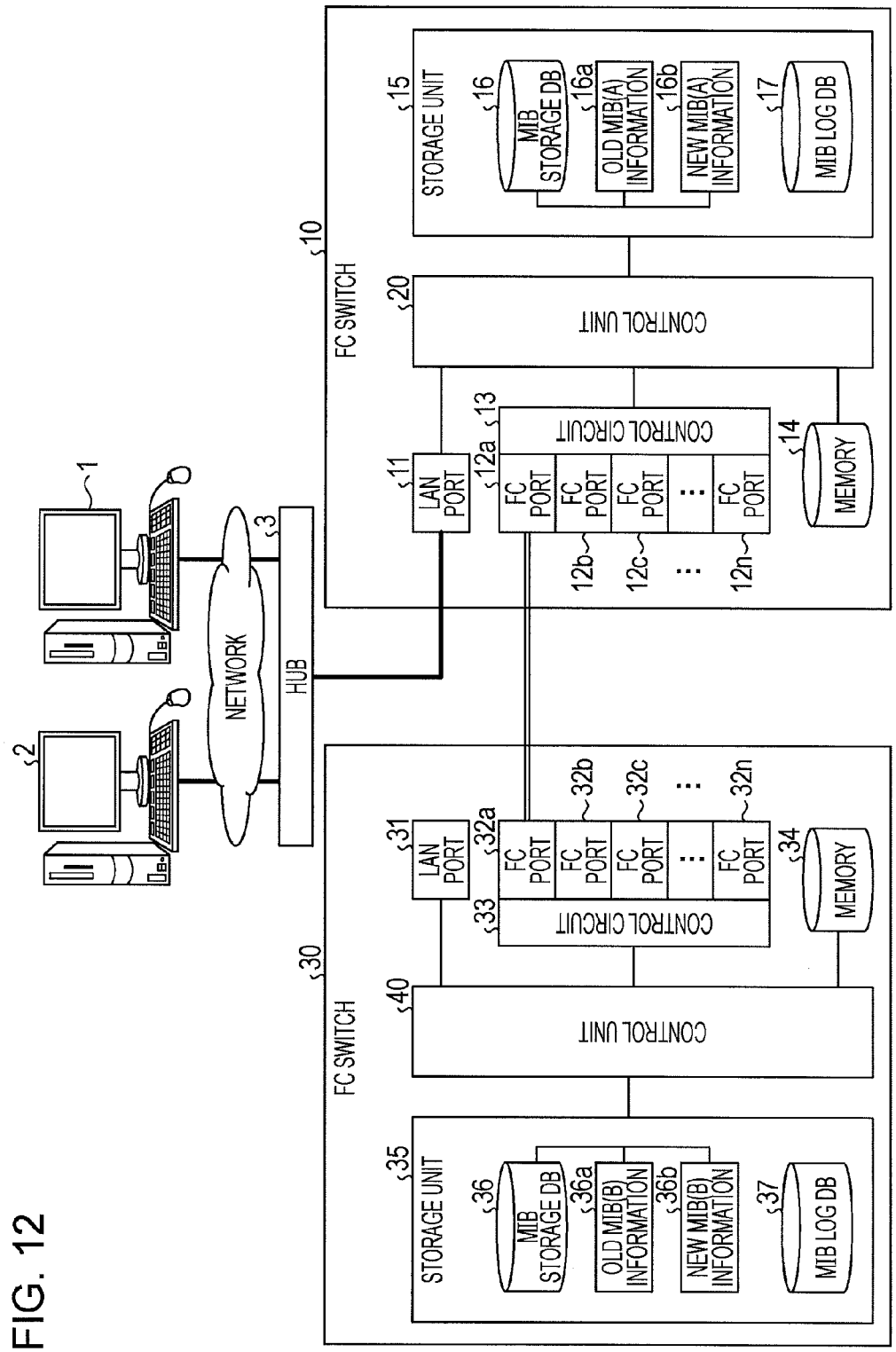
FIG. 12 is a diagram illustrating an example of cascade-connected FC switches according to an embodiment 4.

FIG. 12 is a diagram illustrating an example of cascade-connected FC switches according to the embodiment 4.

As illustrated in FIG. 12, the FC switch 10 and the FC switch 30 are cascade-connected with each other and the FC switch 10 is connected with each of the management device 1 and a management device 2 via network equipment such as a hub or the like.

The configuration of the FC switch 10 is the same as that of the FC switch 10 which has been described in the embodiments 1 and 2. Likewise, the configuration of the FC switch 30 is the same as that of the FC switch 10 which has been described in the embodiments 1 and 2. In addition, although the management device and the management device 2 similarly function as SNMP managers, the MIB information of the FC switch that the management device 1 manages may not match the MIB information of the FC switch that the management device 2 manages in some cases.

Next, flows of processes executed using the cascade-connected FC switches according to the embodiment 4 will be described with reference to FIG. 13 to FIG. 15.

Figure 13:
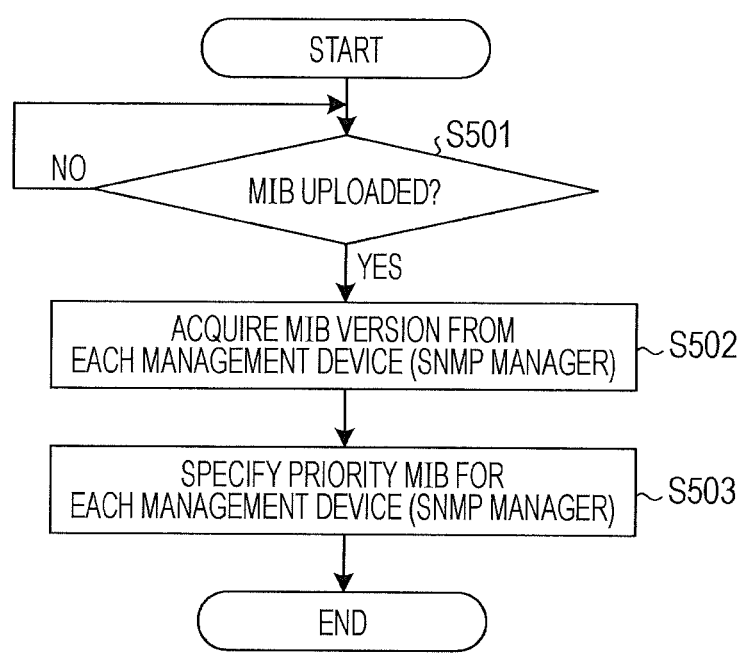
FIG. 13 is a flowchart illustrating an example of a flow of an MIB specifying process executed using the FC switches according to the embodiment 4.
Figure 14:
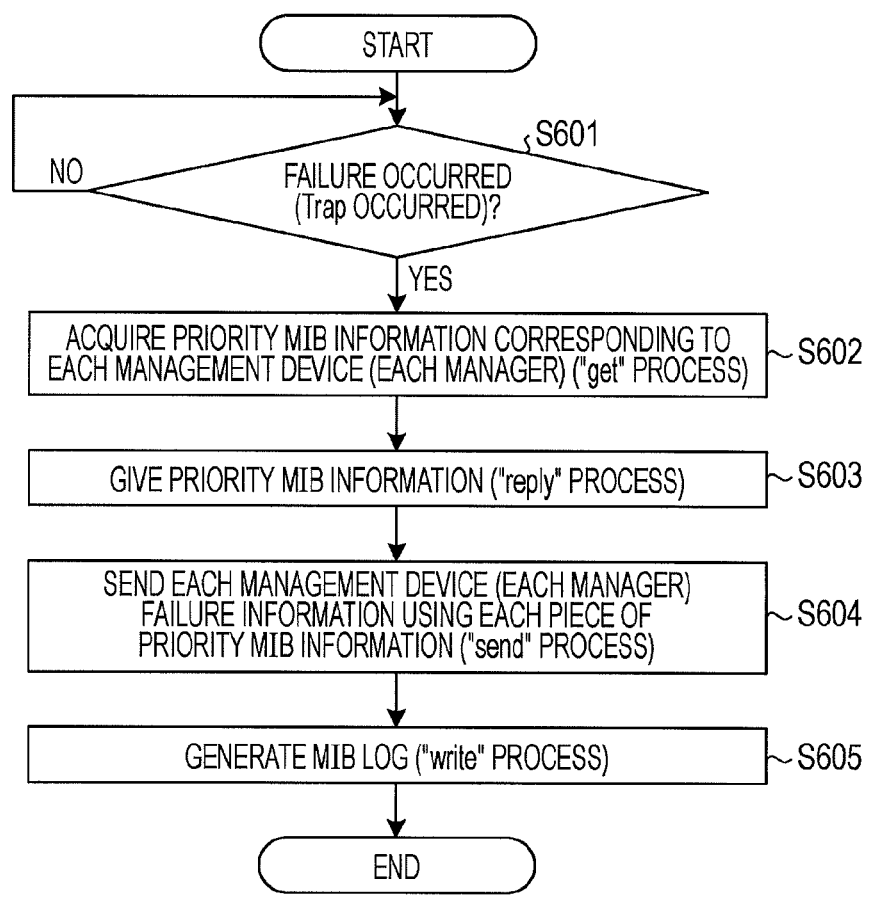
FIG. 14 is a flowchart illustrating an example of a flow of an MIB notifying process executed using the FC switches according to the embodiment 4.

FIG. 13 is a flowchart illustrating an example of a flow of an MIB specifying process executed using the FC switches according to the embodiment 4. FIG. 14 is a flowchart illustrating an example of a flow of an MIB notifying process executed using the FC switches according to the embodiment 4. FIG. 15 is a flowchart illustrating an example of a flow of an MIB updating process executed using the FC switches according to the embodiment 4.

As illustrated in FIG. 13, when the MIB information in the MIB storage DB 16 is uploaded with upgrading the control unit 20 or each unit included therein (Yes at step S501), the FC switch 10 executes the process at step S502.

Specifically, the MIB version receive unit 22 of the FC switch 10 acquires version information of the MIB of the FC switch 10 or the cascade-connected FC switch 30 that each management device manages from each of the management device 1 and the management device 2 that function as SNMP managers.

Then, the MIB version receive unit 22 outputs the acquired version information of the MIB concerned to the priority MIB specification unit 23.

Then, the priority MIB specification unit 23 of the FC switch 10 executes the process at step S503 on the basis of the version information of the MIB which has been acquired using the MIB version receive unit 22.

Specifically, the priority MIB specification unit 23 specifies each piece of information that matches each piece of the acquired version information of each MIB from MIB information stored in the MIB storage DB 16 of the FC switch 10 or MIB information stored in the MIB storage DB of the cascade-connected FC switch 30.

For example, the priority MIB specification unit 23 specifies such that the information that matches the version information acquired from the management device 1 is "old MIB information (A)" and the information that matches the version information acquired from the management device 2 is "new MIB information (B)". Then, the priority MIB specification unit 23 determines each piece of the specified MIB information as the priority MIB information of each management device.

In the above mentioned case, the priority MIB specification unit 23 stores the IP (Internet Protocol) addresses, SNMP-based community names and the like of the respective management devices in correspondence with the priority MIB information thereof in the memory 14 or the like in order to grasp to which management device the specified priority MIB information corresponds.

Next, the flow of the MIB notifying process executed using the FC switches according to the embodiment 4 will be described with reference to FIG. 14. As illustrated in FIG. 14, in the case that the SNMP agent control unit 24 of the FC switch 10 detects that a failure has occurred in the FC switch 10 (Yes at step S601), the SNMP agent control unit 24 executes the process at step S602.

Specifically, the SNMP agent control unit 24 executes a "get" process of requesting the priority MIB specification unit 23 to acquire priority MIB information corresponding to each management device (each manager).

Then, the priority MIB specification unit 23 executes a "reply" process of sending the SNMP agent control unit 24 the priority MIB information corresponding to each management device as a response to the request from the SNMP agent control unit 24 (step S603).

Then, the SNMP agent control unit 24 executes a "send" process of sending each management device failure information (OID) indicating the detected failure using each piece of the priority MIB information so specified using the priority MIB specification unit 23 (step S604).

Then, in the case that the MIB information has been sent from the SNMP agent control unit 24 to each of the management devices, the MIB log generation unit 25 executes a "write" process of storing the sent information and failure information into the MIB log DB 17 (step S605).

Next, the flow of the MIB updating process executed using the FC switches according to the embodiment 4 will be described with reference to FIG. 15.

Figure 15:
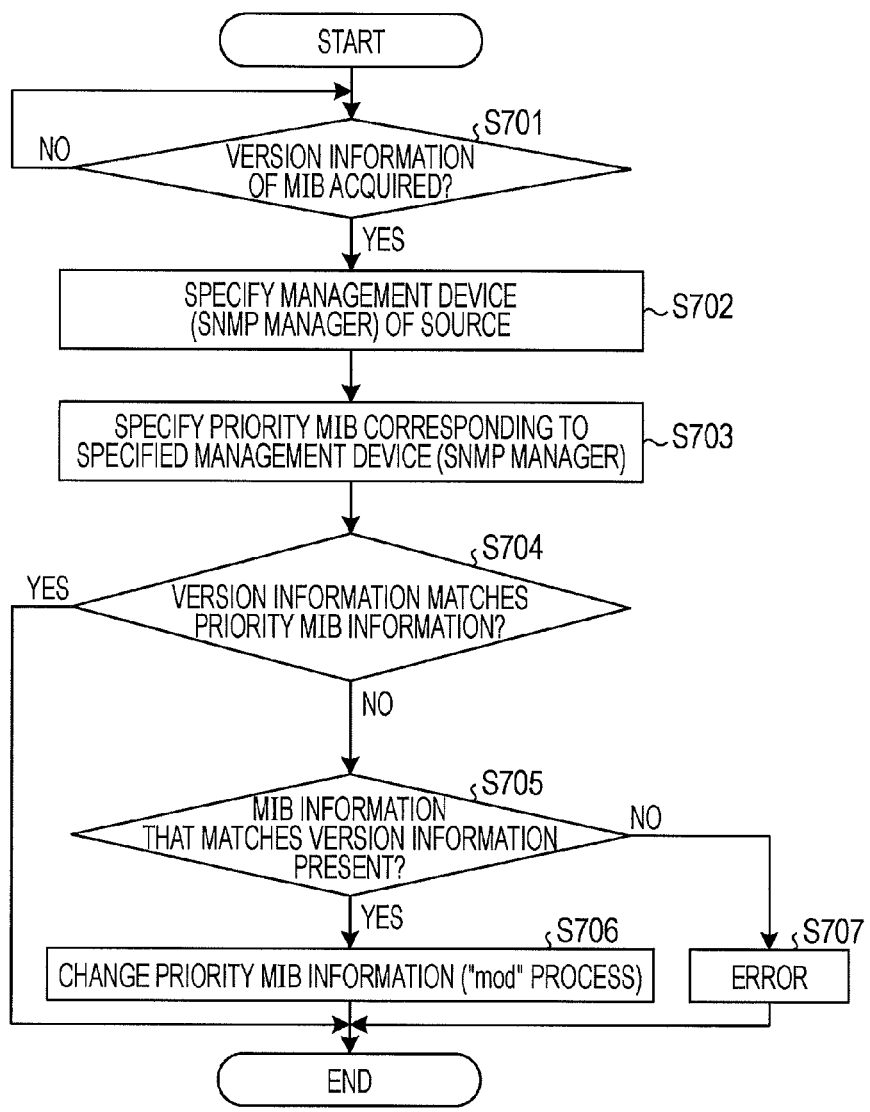
FIG. 15 is a flowchart illustrating an example of a flow of a priority MIB updating process executed using the FC switches according to the embodiment 4.

As illustrated in FIG. 15, the MIB version control unit 22 receives version information of the MIB of the FC switch 10 that each management device manages from each management device as change information indicating that the MIB of the FC switch 10 that each management device manages has been changed (step S701).

Then, the priority MIB specification unit 23 specifies one of the plurality of management devices as the management device from which the version information has been received (step S702) and specifies the priority MIB information corresponding to the specified management device from the IP address, the SNMP-based community name and the like thereof (step S703).

Then, the priority MIB specification unit 23 judges whether the received version information of the MIB matches the current version of the priority MIB information (step S704). Then, in the case that the received version information of the MIB matches the current version of the priority MIB information (Yes at step S704), the priority MIB specification unit 23 terminates execution of the MIB updating process without changing the priority MIB.

On the other hand, in the case that the received version of the MIB does not match the current version of the priority MIB information (No at step S704), the priority MIB specification unit 23 judges whether MIB information that matches the received version information of the MIB is stored in the FC switch 10 or 30 (step S705).

Then, in the case that the MIB information that matches the received version information of the MIB is stored in the FC switch 10 or 30 (Yes at step S705), the priority MIB specification unit 23 executes a "mod" process of setting the MIB information that matches the received version information of the MIB as new priority MIB information (step S706).

On the other hand, in the case that the MIB information that matches the received version information of the MIB is not stored in the FC switch 10 or 30 (No at step S705), the priority MIB specification unit 23 determines that the MIB information that the management concerned manages is not present in the FC switch 10 or 30.

Then, the priority MIB specification unit 23 executes error processing of outputting the alarm or the like indicating occurrence of an error to the management device concerned or the like (step S707). Then, the processes illustrated in FIG. 6 and FIG. 7 are executed using the updated priority MIB information.

As described above, according to the embodiment 4, even in the case that the FC switch is connected with a plurality of management devices, the FC switch is allowed to notify each management device of the MIB information conforming to the MIB update information of each management device.

As a result, it is allowed to perform SNMP-based monitoring and management with accuracy even for a time period from when the MIB information on the side of the SNMP agent has been changed to when the MIB information on the side of the SNMP manager side is changed with changing the MIB information on the side of the SNMP agent.

[e] Embodiment 5

Although various embodiments have been described as mentioned above, the present invention may be embodied in a variety of different ways in addition to the above mentioned embodiments.

As follows, a different embodiment from the above will be described.

Although the FC switch has been described in the embodiments 1 to 4, the switching device is not limited to the FC switch. For example, the switching device may be also applicable to network equipment such as a fabric switch, a router, an L3 switch, a switching hub or the like, and an information processing device such as a server or the like.

In the cascade-connected FC switches which have been described in the embodiments 2 to 4, it is allowed to perform migration of MIB information so as to store the MIB information at an optimum location in order to avoid such a situation that access to MIB information to be sent is not permitted owing to occurrence of a failure in connection of the FC.

Incidentally, the number of FC switches to be cascade-connected is not limited to two as in the embodiments 2 to 4 and a plurality of FC switches may be cascade-connected.

For example, in the case that a plurality of FC switches are cascade-connected with one another, the priority MIB information is stored in an FC switch which is situated near an FC switch which is connected with a management device. In addition, the priority MIB information is stored in the FC switch which is cascade-connected via the FC for redundancy. In addition, the priority MIB information is stored so as to reduce the number of hops between the FC switches. The MIB information may be optimally located by storing it in the above mentioned manner, thereby avoiding such a situation that access to the MIB storage DB in the fabric is not permitted.

In addition, the FC switch may be configured such that a plurality of pieces of past MIB information obtained before updated are stored within a range of the size of the MIB storage DB which is good enough for storing the MIB information and information is sequentially deleted such that older information is deleted earlier than other pieces of information when the amount of information stored in the MIB storage DB exceeds its size.

As a result, the FC switch is allowed to store with efficiency MIB information of several generations and to cope with downgrading on the side of the management device.

In addition, all or some of the processes which have been described to be automatically performed in the processes described in the above mentioned embodiments may be manually performed.

Or, all or some of the processes which have been described to be manually performed may be automatically performed by using known methods.

In addition, the processing procedures, the controlling procedures, the concrete names described in the above document and drawings, and information including various data and parameters indicated in the drawings may be arbitrarily changed unless otherwise specified.

In addition, respective constitutional elements included in each of the illustrated devices are merely conceptual in function and need not necessarily be configured physically as illustrated in the drawings.

That is, respective devices or units may be distributed and integrated with one another in a variety of ways without being limited to the forms illustrated in the drawings such that, for example, the MIB version receive unit 22 is integrated with the priority MIB specification unit 23.

For example, all or some of the devices or units may be configured by being functionally or physically distributed and integrated with one another in units of arbitrary number of devices or units in accordance with various loads exerted thereon and situations in which these devices or units are used.

In addition, all or arbitrary some of respective processing functions to be performed in respective devices or units may be implemented using a CPU and a program which is analyzed and executed using the CPU or may be implemented in wired-logic-based hardware.

Incidentally, the various processes described in the above mentioned embodiments may be implemented by executing programs which are prepared in advance using a computer system such as, for example, a personal computer, a work station and the like. Therefore, in the following, an example of the computer system that executes programs having the same functions as those described in the above mentioned embodiments will be described.

Figure 16:
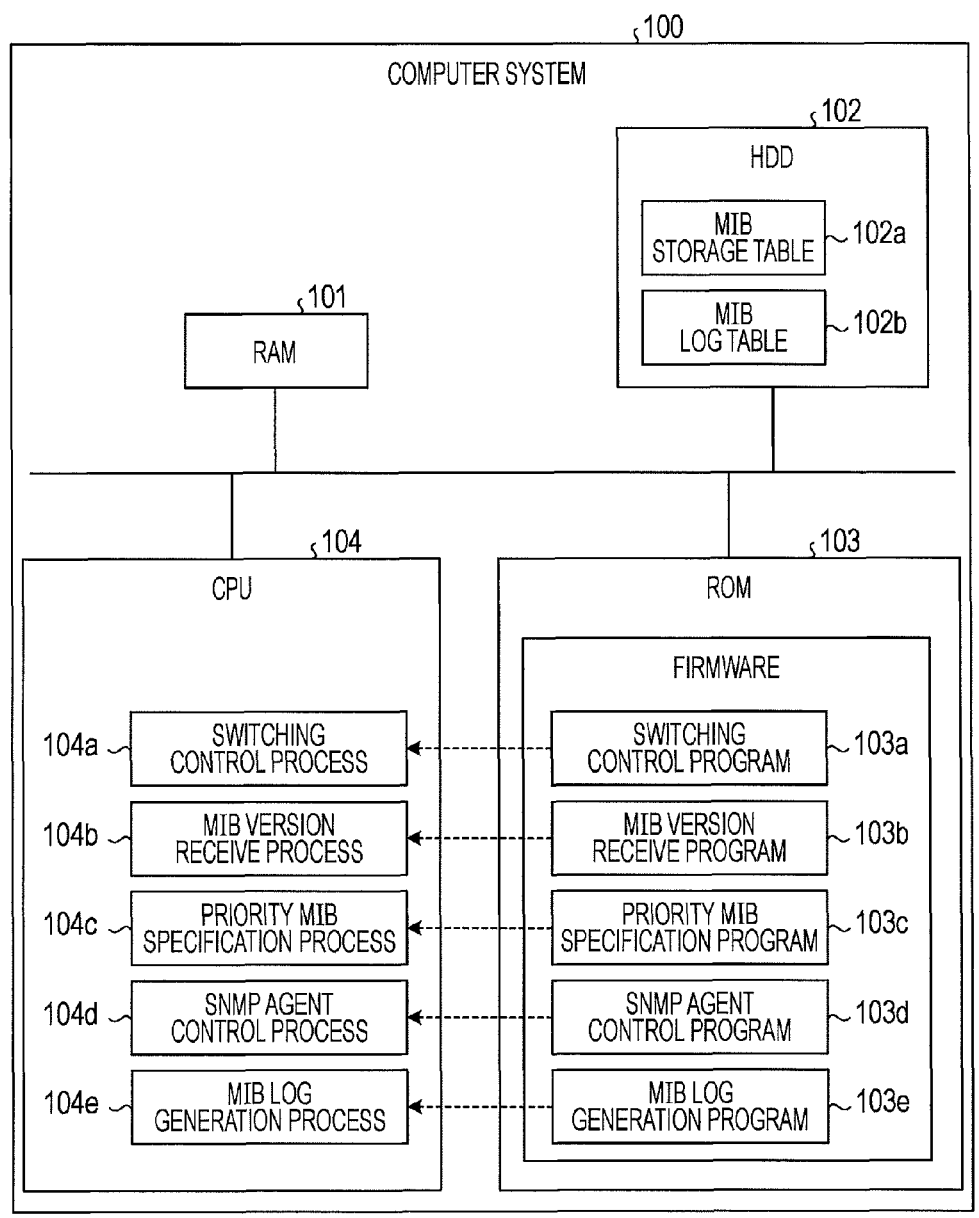
FIG. 16 is a diagram illustrating an example of a computer that executes a failure notification program.

FIG. 16 is a diagram illustrating an example of a computer system 100 that executes a failure notification control program.

As illustrated in FIG. 16, the computer system 100 includes a RAM 101, an HDD 102, a ROM 103 and a CPU 104. In the example illustrated in FIG. 16, firmware including programs which may exhibit the same functions as those in the above mentioned embodiments is stored in advance in the ROM 103.

That is, as illustrated in FIG. 16, a switching control program 103*a*, an MIB version receive program 103*b*, a priority MIB specification program 103*c*, an SNMP agent control program 103*d*, and an MIB log generation program 103*e* are stored in advance in the ROM 103.

Then, the CPU 104 reads out and executes the programs 103*a* to 103*e* included in the firmware to function as respective processes as illustrated in FIG. 16.

That is, the CPU 104 functions as a switching control process 104*a*, an MIB version receive process 104*b*, a priority MIB specification process 104*c*, an SNMP agent control process 104*d*, and an MIB log generation process 104*e*.

Incidentally, the switching control process 104*a* corresponds to the switching control unit 21 illustrated in FIG. 2. Likewise, the MIB version receive process 104*b* corresponds to the MIB version receive unit 22.

Likewise, the priority MIB specification process 104*c* corresponds to the priority MIB specification unit 23, and the SNMP agent control process 104*d* corresponds to the SNMP agent control unit 24.

Likewise, the MIB log generation process 104*e* corresponds to the MIB log generation unit 25.

In addition, the HDD 102 includes an MIB storage table 102*a* and an MIB log table 102*b*.

The MIB storage table 102*a* corresponds to the MIB storage DB 16 illustrated in FIG. 2. Likewise, the MIB log table 102*b* corresponds to the MIB log DB 17.

Incidentally, the programs 103*a* to 103*e* need not necessarily be stored in the ROM 103. The programs may be stored, for example, in a "portable physical medium" such as, for example, a flexible disk (FD), a CD-ROM, a DVD disk, a magnet-optical disk, an IC card or the like which is inserted into the computer system 100.

Alternatively, the programs may be stored in a "fixed physical medium" such as, for example, a hard disk drive (HDD) or the like which is installed inside or outside the computer system 100.

Also alternatively, the programs may be stored in "another computer system" which is connected with the computer system 100 via a public circuit, Internet, a LAN, a WAN or the like.

Then, the computer system 100 may execute the above mentioned programs by reading them out of the above medium/media.

That is, the programs which are referred to in the above mentioned other embodiments are computer-readably stored into a recording medium such as the above mentioned "portable physical medium", "fixed physical medium", "communication medium" and the like.

Then, the computer system 100 implements the same functions as those in the above mentioned embodiments by reading the programs out of a recording medium/recording media as mentioned above and executing them.

Incidentally, the programs which are referred to in the above mentioned other embodiments are not limited to programs which are executed using the computer system 100.

For example, the present invention may be similarly applied to a case in which programs are executed using another computer system or a server and to a case in which another computer system cooperates with a server to execute programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching device comprising:
   a storage unit configured to store management information of an object being monitored by a management device to detect failure of the object, the management information including updated management information of the object and before updated management information of the object;
   a specification unit configured to
      acquire information for specifying management information stored in the management device and which is used by the management device to monitor the object, and
      specify, on the basis of the acquired information, one of the updated management information and the before updated management information of the management information stored in the storage unit, to thereby match the specified one of the updated management information and the before updated management information stored in the storage unit of the switching device and the specified management information stored in the management device and used by the management device to monitor the object; and
   an information sending unit configured to send failure information to the management device on the basis of the specified one of the updated management information and the before updated management information stored in the storage unit, in the case that the failure has been detected.

2. The switching device according to claim 1, wherein
   in the case that the management information stored in the management device has been updated, the specification unit
      acquires the information for specifying the management information stored in the management device from the management device, and
      specifies one of the updated management information and the before updated management information stored in the storage unit on the basis of the acquired information.

3. The switching device according to claim 1, wherein
   in the case that the specified one of the updated management information and the before updated management information is not stored in said switching device and is instead stored in another switching device which is cascade-connected with said switching device, the specification unit specifies the one of the updated management information and the before updated management information which is stored in the cascade-connected switching device, and
   in the case that the sending unit has detected the failure, the information sending unit acquires the one of the updated management information and the before updated management information stored in the cascade-connected switching device which has been specified using the specification unit and sends the failure information to the management device on the basis of the acquired management information.

4. The switching device according to claim 3, wherein
in the case that the specification unit has specified the one of the updated management information and the before updated management information stored in the cascade-connected switching device, the specification unit stores a specified one of the updated management information and the before updated management information which is stored in the cascade-connected switching device into the storage unit, and in the case that the sending unit has detected the failure, the information sending unit sends the failure information to the management device on the basis of the one of the updated management information and the before updated management information which is stored in the storage unit and has been stored in the cascade-connected switching device.

5. The switching device according to claim 3, wherein
in the case that communication between said switching device and the management device has been disconnected, the information sending unit sends the failure information to the management device via the cascade-connected switching device.

6. The switching device according to claim 1, wherein
in the case that information specifying the management information has been acquired from a plurality of management devices, the specification unit specifies management information that each of the management devices manages from the management information that the storage unit stores, on the basis of the acquired information for each management device, and in the case that the information sending unit has detected the failure, the sending unit sends the failure information to each of the plurality of management devices on the basis of the management information for each management device which has been specified using the specification unit.

7. The switching device according to claim 1, wherein the updated management information is management information after a firmware update, and the before updated management information is management information before the firmware update.

8. An information processing device comprising:
a storage unit configured to store management information of an object being monitored by a management device to detect failure of the object, the management information including updated management information of the object and before updated management information of the object;

a specification unit configured to
acquire information for specifying management information stored in the management device and which is used by the management device to monitor the object, and specify, on the basis of the acquired information, one of the updated management information and the before updated management information of the management information stored in the storage unit; and an information sending unit configured to send failure information to the management device on the basis of the specified one of the updated management information and the before updated management information stored in the storage unit, in the case that the failure has been detected.

9. The information processing device according to claim 8, wherein the updated management information is management information after a firmware update, and the before updated management information is management information before the firmware update.

10. A computer-readable, non-transitory medium storing a program that, when executed by a computer, causes the computer to execute a procedure, wherein a storage unit stores management information of an object being monitored by a management device to detect failure of the object, the management information including updated management information of the object and before updated management information of the object, the procedure comprising:

acquiring information used to specify management information stored in the management device and which is used by the management device to monitor the object;

specifying, on the basis of the acquired information, one of the updated management information and the before updated management information of the management information stored in the storage unit; and sending the management device failure information on the basis of the specified one of the updated management information and the before updated management information stored in the storage unit, in the case that the failure has been detected.

11. The computer-readable, non-transitory medium according to claim 10, wherein the updated management information is management information after a firmware update, and the before updated management information is management information before the firmware update.

* * * * *